June 18, 1963 W. H. BERCH ETAL 3,094,700
RECORDING CONTROL CIRCUIT
Filed Nov. 23, 1959
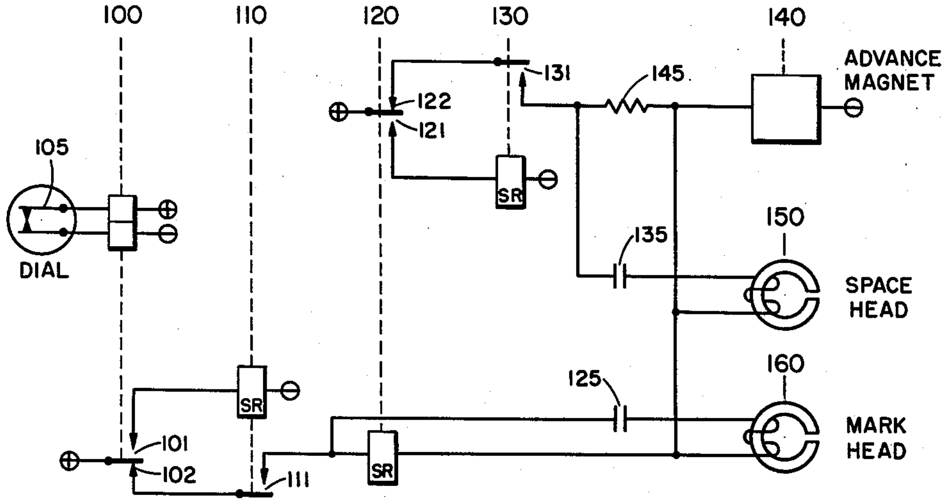
INVENTORS.
WILLIAM H. BERCH
BEN A. HARRIS
BY F. H. Henson
ATTORNEY United States Patent Office 3,094,700

Patented June 18, 1963

3,094,700
RECORDING CONTROL CIRCUIT

William H. Berch, Penfield, and Ben A. Harris, Rochester, N.Y., assignors to General Dynamics Corporation, Rochester, N.Y., a corporation of Delaware Filed Nov. 23, 1959, Ser. No. 854,667
2 Claims. (Cl. 346—74)

This invention relates in general to recording devices and, more particularly, to magnetic recording devices.

Although the invention herein disclosed is suitable for more general applications, it is particularly adapted for use with magnetic recorders of the type described in the patent to Gleason, No. 2,867,435, which is assigned to the same assignee as the present invention.

The use of magnetic tape, or wire, for making a recording of electrical variations of currents representing speech, music, sound, digital pulses, or any other form of intelligence which may be represented by variations of current, is well known. Such systems conventionally use tape or wire which is moved at a constant velocity and in close proximity to a recording head which is subjected to variations of current and thereby causes a variation in the magnetic density of the recording medium. In situations where digital information is being recorded on the magnetic medium, it is known to make the recording while the magnetic medium is stationary and to advance the magnetic medium in discrete increments between successive recordings. The recorder disclosed in the above-identified Gleason patent was specifically designed for such recording.

With the Gleason recorder, it is important that each recording be completed prior to any movement of the tape to avoid smearing or merging two signals into one. Consequently, systems employing the Gleason recorder, such as the one shown in the Morris et al. Patent No. 2,877,311, which is assigned to the same assignee as the present invention, employ a total of nine relays for controlling the recording of digital pulses on the magnetic medium. Thus, the recording control circuit is costly in terms of both expense and space.

Accordingly, it is the general object of this invention to provide a new and improved means for recording digital information on a stationary magnetic medium.

It is a more particular object of this invention to provide a new and improved circuit means for recording digital information on a stationary magnetic medium using a minimum amount of equipment.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows circuit means for recording digital information on a stationary magnetic medium.

It is to be understood that only the details of the circuit necessary to understand the invention have been shown. For example, the recorder disclosed in the Gleason patent includes an erase head, a clutch magnet, and various other contacts which it is not necessary to show for a full understanding of this invention. In addition, various other contacts of control relays might be introduced at certain points in the circuit to facilitate convenient control. Furthermore, as a convenience in simplifying the drawing, the power supply has not been shown and all terminals which should be connected to the positive pole thereof are indicated by a positive (+) symbol, while all terminals which should be connected to the negative pole thereof are indicated by a negative (—) symbol.

This invention is not intended to be limited to use with the Gleason recorder. However, the Gleason recorder is particularly suited for recording digital information and, accordingly, this invention will be described as cooperating with the Gleason recorder.

In telephone systems of the toll ticketing type it is necessary to store digital information indicative of certain information pertaining to each billable call. The Gleason recorder is intended for recording such digital information as it has two recording channels with an individual head for recording in each channel. One channel, referred to as the mark channel, is used for recording a series of pulses which are spaced apart from each other. The spacing apart of the individual marks is achieved by advancing the tape in uniform increments after each recording. The second channel, referred to as a space channel, is used for recording an individual pulse to designate the end of a series of pulses in the other channel representing a particular digit. Thus, the Gleason recorder contemplates the recording of a series of pulses in one channel followed by a single pulse in another channel to indicate the end of a digit. After the recording of each pulse in either channel, the tape is advanced to place a new section of the tape under the recording heads.

It is believed that the invention can best be understood by describing the circuit operation as the recording heads are energized for recording information on the magnetic medium. For this purpose, assume that relay 100 is controlled by dial contacts 105, which are normally closed but open a number of times corresponding to the digit that it is desired to record. It will be shown that for each opening of contacts 105, that relay 100 releases and a recording is made on the tape, not shown, by passing a pulse of current through mark head 160 and that after each recording, advance magnet 140 operates to advance the tape. Finally, after the series of pulses has been recorded, it will be shown that a pulse of current is passed through the space head 150 and that, subsequently, the advance magnet 140 will be operated to again advance the tape.

With dial contacts 105 closed relay 100 will be operated thereby opening contacts 102 and closing contacts 101. Closed contacts 101 complete an obvious circuit to energize and operate relay 110 which, it will be noted, is designated as a slow release relay. As a result of the slow release characteristic of relay 110, it will remain operated for brief periods even though contact 101 may open and, furthermore, relay 110 will remain operated as long as contacts 101 reclose within a predetermined interval as determined by the slow release characteristic of the relay. Examination of the circuit will reveal that capacitors 125 and 135 will be discharged while relay 100 is operated.

When relay 100 pulses under control of dial contacts 105, relay 110 will be held operated by virtue of its slow release characteristic. The first closure of contacts 102 will cause relay 120 to be energized in series with advance magnet 140. Both relay 120 and advance magnet 140 will be thereby operated, however, as with any electromechanical device they cannot operate instantaneously. Thus, during the operate time of the advance magnet 140, capacitor 125 will be charged over the following circuit: from ground (+ side of power supply), closed contacts 102, closed contacts 111, capacitor 125, the winding of mark head 160 and advance magnet 140 to battery (— side of power supply). The pulse of current passed through recording head 160 causes a mark to be placed on the magnetic medium.

The value of capacitor 125 is so chosen that it can become fully charged and thereby stop the flow of current in recorder head 160 before advance magnet 140 is able to operate over the circuit previously traced. Eventually, however, both the advance magnet 140 and relay 120 will operate. At the conclusion of the first pulse, relay 100 will reoperate thereby causing contacts 101 to reclose and reenergize relay 110 to hold it operated. The opening of contacts 102 does not cause relay 120 to release immediately as it, like relay 110, is specifically designed to be slow release and, therefor, will remain operated as long as contacts 102 do not remain open longer than a predetermined time. While relay 100 is operated, capacitor 125 will be discharged through the recording head 160 and through relay 120. The pulse of current thereby produced through recording head 160 is in the opposite direction from the recording pulse, or more specifically, in the same direction as an erase signal and, therefore, does not produce a recording on the tape. The operation of relay 120 closed an obvious circuit to relay 130 through contacts 121. Relay 130 operates at this time and closes contacts 131, which have no effect at present.

Each subsequent pulse of the digit being recorded pulses relay 100 and causes a charging current to pass through capacitor 125 and recording head 160 to make a recording on the tape and thereafter the advance magnet 140 is operated to advance the tape.

At the end of the train of pulses representing a particular digit, relay 100 remains operated thereby holding the circuit to relay 120 open at contacts 102 and, therefore, relay 120 releases at the end of its slow release time. Release of relay 120 opens contacts 121 and closes contacts 122 thereby closing a circuit from ground through closed contacts 122, closed contacts 131, capacitor 135, recording head 150 and advance magnet 140 to battery to cause a magnetic impression to be made on the space channel and, subsequent to this recording, advance magnet 140 is operated over the simultaneously closed circuit from ground at contacts 122, closed contacts 131, resistor 145 and advance magnet 140 to battery. At the end of its slow release time, relay 130, which was open-circuited by release of relay 120, will release. Resistor 145 in series with the advance magnet 140 serves to provide a voltage drop in the series circuit that operates the advance magnet to permit a voltage to be built up across capacitor 135 as it charges. The resistance of relay 120 serves the same function with respect to capacitor 125. The release of relay 130 causes capacitor 135 to be discharged. The series of marks representing the digit are now recorded in one channel of the tape and a single space pulse is recorded in the other channel. The system is now ready to receive and record additional digits.

As has been demonstrated, this invention serves to record mark and space pulses on the magnetic medium of the Gleason or similar recorder with the use of only two relays in addition to pulsing relay 100 and control relay 110. Other circuits for controlling the Gleason recorder, as shown in the referenced Morris patent, require two relays individual to each recording head and three additional slow release relays to control the two relays associated with the space recording head plus, of course, the equivalent of relays 100 and 110. Therefore, a circuit has been described using a total of four relays which provides a means for controlling the recording of digital pulses on a magnetic medium that had previously required nine relays.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a system for recording digital information on a magnetic medium comprising first and second channels, a drive magnet adapted to advance the magnetic medium in discrete increments, a source of electrical signals representing digital information, first and second recording heads adapted to make a magnetic recording on said medium in said first and second channels, respectively, in response to said electrical signals, circuit means responsive to each of said signals for simultaneously completing a circuit to said drive magnet and said first recording head, means also responsive to each of said signals for terminating the flow of current in said first recording head during the operate time of said drive magnet, other circuit means responsive to the end of each series of signals representing a digit for simultaneously completing a circuit to said drive magnet and said second recording head, and means also responsive to the end of each series of signals representing a digit for terminating the flow of current in said second recording head prior to the operation of said drive magnet whereby said recordings are made while the magnetic medium is stationary.

2. In a system for recording digital information on a magnetic medium, means including a drive magnet having a predetermined operate time for advancing the magnetic medium in discrete increments, a source of electrical signals representing digital information, a recording head adapted to make magnetic recordings on said medium in response to signals from said source, means responsive to each signal from said source for simultaneously completing a direct current circuit to said drive magnet and said recording head, a capacitor connected in a series circuit with said recording head and having a charge time which is less than the predetermined operate time of said drive magnet for terminating the flow of direct current in said recording head when said capacitor is charged, and means for passing said direct current through said series circuit and around said series circuit when said capacitor is not and is charged, respectively, whereby the recordings are made while the magnetic medium is stationary.

References Cited in the file of this patent

UNITED STATES PATENTS

| | | |
|---|---|---|
| 2,546,821 | Hansen | Mar. 27, 1951 |
| 2,648,589 | Hickman | Aug. 11, 1953 |
| 2,722,676 | Begun | Nov. 1, 1955 |
| 2,767,243 | Steeneck | Oct. 16, 1956 |
| 2,894,798 | Potter | July 14, 1959 |
| 2,986,725 | Dirks | May 30, 1961 |